(12) United States Patent
Schauerte et al.

(10) Patent No.: US 11,242,745 B2
(45) Date of Patent: Feb. 8, 2022

(54) DRILL HEAD FOR EARTH BORING, DRILLING DEVICE FOR EARTH BORING HAVING THE DRILL HEAD, METHOD TO DETECT OBJECTS WHILE EARTH BORING, AND USE OF DIRECT DIGITAL SYNTHESIZER AS A SIGNAL IN DETECTING AN OBSTACLE IN EARTH BORING

(71) Applicants: TRACTO-TECHNIK GmbH & Co. KG, Lennestadt (DE); IDS GeoRadar s.r.l., Pisa (IT); Florence Engineering s.r.l., Florence (IT); OSYS Technology ltd., Newcastle upon Tyne (GB)

(72) Inventors: Manfred Schauerte, Schmallenberg (DE); Devis Dei, Florence (IT); Guido Manacorda, Pisa (IT)

(73) Assignees: TRACTO-TECHNIK GmbH & Co. KG, Lennestadt (DE); IDS GeoRadar s.r.l., Pisa (IT); Florence Engineering s.r.l., Florence (IT); OSYS Technology Ltd., Newcastle upon Tyne (GB)

( * ) Notice: Subject to any disclaimer, the term of this patent is extended or adjusted under 35 U.S.C. 154(b) by 115 days.

(21) Appl. No.: 15/962,201

(22) Filed: Apr. 25, 2018

(65) Prior Publication Data
US 2018/0313209 A1 Nov. 1, 2018

(30) Foreign Application Priority Data
Apr. 26, 2017 (EP) .................................... 17000714

(51) Int. Cl.
| | | |
|---|---|---|
| E21B 47/09 | (2012.01) | |
| E21B 47/13 | (2012.01) | |
| E21B 7/04 | (2006.01) | |
| G01V 8/00 | (2006.01) | |
| G01S 13/02 | (2006.01) | |

(Continued)

(52) U.S. Cl.
CPC .............. *E21B 47/13* (2020.05); *E21B 7/024* (2013.01); *E21B 7/046* (2013.01); *E21B 47/002* (2020.05); *E21B 47/09* (2013.01); *G01S 13/0209* (2013.01); *G01S 13/885* (2013.01);

(Continued)

(58) Field of Classification Search
CPC ............................... E21B 7/046; E21B 47/122
See application file for complete search history.

(56) References Cited

U.S. PATENT DOCUMENTS

| | | |
|---|---|---|
| 3,731,752 A | 5/1973 | Schad |
| 4,045,724 A | 8/1977 | Shuck et al. |

(Continued)

FOREIGN PATENT DOCUMENTS

| | | |
|---|---|---|
| CN | 201984165 U | 9/2011 |
| GB | 2473559 A | 3/2011 |

(Continued)

*Primary Examiner* — Cathleen R Hutchins
*Assistant Examiner* — Ronald R Runyan
(74) *Attorney, Agent, or Firm* — Howard IP Law Group, PC

(57) ABSTRACT

A drill head for earth boring, in particular for a horizontal drilling device, includes a housing, a transmitter for generating a radio signal, an antenna and a receiver for receiving a reflected radio signal, wherein the transmitter which is adapted to generate the radio signal includes a direct digital synthesizer.

14 Claims, 3 Drawing Sheets

(51) Int. Cl.
*G01S 13/88* (2006.01)
*E21B 7/02* (2006.01)
*E21B 47/002* (2012.01)

(52) U.S. Cl.
CPC ............ *G01S 13/887* (2013.01); *G01V 8/005* (2013.01); *E21B 7/02* (2013.01)

(56) References Cited

U.S. PATENT DOCUMENTS

| | | | |
|---|---|---|---|
| 4,162,400 A | 7/1979 | Pitts, Jr. | |
| 4,864,293 A | 9/1989 | Chau | |
| 5,453,693 A * | 9/1995 | Sinclair | G01V 3/30 |
| | | | 324/324 |
| 5,867,117 A * | 2/1999 | Gogineni | G01S 13/0209 |
| | | | 342/128 |
| 5,881,310 A * | 3/1999 | Airhart | H01L 41/0835 |
| | | | 710/3 |
| 5,904,210 A * | 5/1999 | Stump | E21B 7/046 |
| | | | 175/40 |
| 6,012,536 A * | 1/2000 | Puttmann | E21B 7/06 |
| | | | 175/103 |
| 6,072,769 A | 6/2000 | Ho | |
| 6,315,062 B1 | 11/2001 | Alft et al. | |
| 6,417,666 B1 | 7/2002 | Mercer | |
| 6,644,421 B1 | 11/2003 | Long | |
| 6,755,263 B2 | 6/2004 | Alft et al. | |
| 7,143,844 B2 | 12/2006 | Alft et al. | |
| 7,324,816 B2 | 1/2008 | Sherman et al. | |
| 7,443,154 B1 | 10/2008 | Merewether et al. | |
| 7,624,816 B2 | 12/2009 | Cole et al. | |
| 8,827,007 B2 | 9/2014 | Malcolm | |
| 9,366,092 B2 | 6/2016 | Hutin et al. | |
| 9,425,897 B2 | 8/2016 | Nishihara et al. | |
| 2005/0173153 A1 | 8/2005 | Alft et al. | |
| 2005/0194182 A1 | 9/2005 | Rodney et al. | |
| 2005/0232300 A1 | 10/2005 | Stiscia et al. | |
| 2006/0164918 A1 * | 7/2006 | Gardner | E21B 47/20 |
| | | | 367/83 |
| 2007/0064834 A1 * | 3/2007 | Yoshizawa | G06F 1/0328 |
| | | | 375/295 |
| 2009/0183917 A1 * | 7/2009 | Sharp | E21B 47/022 |
| | | | 175/40 |
| 2010/0012377 A1 | 1/2010 | Sharp et al. | |
| 2012/0006597 A1 | 1/2012 | Boike | |
| 2013/0057411 A1 * | 3/2013 | Bell | E21B 47/10 |
| | | | 340/853.3 |
| 2013/0075160 A1 | 3/2013 | Tang | |
| 2013/0176137 A1 | 7/2013 | Kolpack et al. | |
| 2014/0085098 A1 | 3/2014 | Stolpman et al. | |
| 2018/0210854 A1 | 7/2018 | Vonnahme et al. | |

FOREIGN PATENT DOCUMENTS

| | | |
|---|---|---|
| JP | H10294712 A | 11/1998 |
| JP | H11083995 A | 3/1999 |
| JP | 2000204883 A | 7/2000 |
| JP | 2001506011 A | 5/2001 |
| JP | 2005017100 A | 1/2005 |
| JP | 2005017101 A | 1/2005 |
| JP | 2009503306 A | 1/2009 |
| JP | 2015076865 A | 4/2015 |
| WO | 2003080988 A2 | 10/2003 |
| WO | 2009032595 A2 | 3/2009 |
| WO | 2016014451 A1 | 1/2016 |

* cited by examiner

DRILL HEAD FOR EARTH BORING, DRILLING DEVICE FOR EARTH BORING HAVING THE DRILL HEAD, METHOD TO DETECT OBJECTS WHILE EARTH BORING, AND USE OF DIRECT DIGITAL SYNTHESIZER AS A SIGNAL IN DETECTING AN OBSTACLE IN EARTH BORING

CROSS-REFERENCE TO RELATED APPLICATIONS

This application claims priority to European Patent Application No. 17 000 714.0 filed Apr. 26, 2017, the entire contents of which are incorporated herein by reference for all purposes.

FIELD OF THE INVENTION

The invention relates to a drill head, and in particular to a drill head for a horizontal drilling device, a drilling device for earth boring, especially a horizontal drilling device, comprising the drill head, a method to detect objects while earth boring, especially using a horizontal drilling device, and use of direct digital synthesizer as a signal in detecting an obstacle in earth boring.

BACKGROUND

Obstacles in front of the drill head of a drilling device for earth boring pose a problem in the horizontal drilling technique. Such obstacles may for example involve boulders of hard rock that oftentimes cannot be crushed by the used drilling devices. Furthermore, water, gas, telephone, or power lines can be located in regions near the earth's surface and they should not be damaged or destroyed during drilling.

Solving this problem led to the development of steerable horizontal drilling devices. Such drilling devices, designated HDD (Horizontal Directional Drilling), render it possible to navigate around obstacles. It is further known to sort obstacles by means of georadar survey in order to enable to circumnavigate obstacles in view of the location determination.

Obstacles in the earth are normally detected reliably by the radar unit in that electromagnetic waves radiating from the radar unit are reflected from electrically discontinuities caused by parts of the obstacles and received again by the radar unit. By analyzing the received electromagnetic waves, it is possible i.a. to determine the position, i.e. the direction of the obstacle relative to the drill head, the distance thereto and to use the information for a course correction of the drilling device.

U.S. Pat. No. 6,755,263 B2 discloses systems and methods for sensing at an underground drilling device in communication with an above-ground locator. The systems and methods involve transmitting a radar probe signal from the underground drilling device. A radar return signal is received at the underground drilling device. The radar return signal is processed at the underground drilling device to produce sensor data. The sensor data is transmitted in a form suitable for reception by the above-ground locator. The ground penetrating radar described in U.S. Pat. No. 6,755,263 B2 is the micropower-impulse radar (MIR) which is essentially a low power radar whose range of inspection is limited.

The integration of a radar unit in a horizontal drilling device, however, represents a major problem. Since the radar unit normally is used to monitor the region in front of the drill head, it is sensible to arrange the radar unit in the drill head in order to preclude the horizontal drilling device itself from interfering with the electromagnetic waves. Further, the drill head is subject to harsh environmental influences so that electronic devices in the drill head may be subject to extensive wear and/or damages. In a horizontal drilling device, the drill head represents a component that is subject to most intense stress because it transmits to the earth the static and dynamic (when a percussion device is involved) drilling forces, generated by a drive unit of the horizontal drilling device. Further, the space in the drill head is limited.

SUMMARY

Starting from the prior art, the invention is based on the object to provide an advantageous possibility to integrate a radar unit in a drill head which solves or addresses at least one of the above-mentioned drawbacks, especially provides an improved detection of an obstacle.

This object is solved by the subject-matter disclosed herein. Advantageous embodiments are also disclosed herein.

The essence of the invention resides in the finding that instead of a micropower impulse radar (MIR), which is a low-power, ultra-wideband radar, a Direct Digital Synthesizer (DDS) can be used. A DDS is a type of frequency synthesizer which can be used for creating arbitrary waveforms from a single, fixed-frequency reference clock. The waveform can be of sinusoidal shape. Preferably, a preselected frequency can be used. The DDS can transmit the signal with a constant repetition frequency. The repetition frequency is the inverse of the period at which the transmitter is fired. The repetition frequency can be selected and programmed. The power which can be transmitted into the ground can be higher than using MIR.

In a preferred embodiment, the reflected radio signal can be processed above ground and that processing of the reflected radio signal is done above ground. As a consequence in the drill head no processing has to take place but only transmission of the reflected radio signal—received by the drill head—has to take place. Therefore, the number of electronic components in the drill head can be further decreased and the electronic components in the drill head can be less complex. A drill head for earth boring according to the invention, in particular for a horizontal drilling device, thus can comprise a receiver which is adapted such that the reflected radio signal can be transmitted unprocessed to a device above ground.

A horizontal drilling device which can be used in horizontal directional drilling (HDD) encompasses according to the invention a device to trenchlessly drill a hole in the earth or soil. A drill head can be used which can be steered. The purpose in drilling the hole in the ground can be to install an underground pipe, conduit or cable along the hole to be drilled. The pipe can be made of a material such as a polymer, for example PVC, polyethylene and/or polypropylene, ductile iron and/or steel. The pipe can be pulled through the drilled hole during or after drilling the hole.

The term "housing" according to the invention encompasses a space that is at least partially surrounded by a section of an outer contour of the drill head.

A "transmitter" according to the invention encompasses a pulse generator which is functionally coupled to the antenna for sending out electromagnetic waves, i.e. the radio signal. Radar, especially for the earth boring, is ground penetrating-radar which is a sensitive technique for detecting even small changes in the subsurface dielectric constant. Using radar, images can be generated and can contain a great amount of detail. The main purpose for using radar in horizontal directional drilling is to detect obstacles in front of the drill head. Transmitter and receiver can be part of an object/obstacle-detection system. The transmitter can in one embodiment comprise an antenna and circuit components which are used to generate the radio signal.

The drill head can comprise an antenna to receive a radio signal and to transmit a radio signal. It is possible that the drill head comprises a single antenna for both transmission and receiving/reception of the radio signal. However, two antennas are possible, one for transmitting and one for receiving. However, an additional antenna or additional antennas, especially for different purposes, for example transmitting and/or receiving localizing information and/or control or steering information and/or commands, can be provided as well. The antenna or antennas will preferably be located inside the drill head or on its surface in a conformal configuration. In case that the antenna is located inside the drill head, at least a portion of the drill head comprises a non-metallic material, preferably a dielectric material, especially a hard plastic (preferably POM), or radar wave transparent material, which allows for a transmission from the drill head into the earth.

A "receiver" according to the invention encompasses a device which is adapted to receive electromagnetic waves, in particular the previously transmitted radio signal which is reflected from an object.

The "receiver" and the "transmitter" can use the same transmitting/receiving unit.

The term that the "receiver is adapted such that the reflected radio signal is transmitted unprocessed above ground" encompasses that the received reflected radio signal can be transmitted by the receiver itself, i.e. the receiver can comprise a transmission means, or the receiver is functionally connected to a transmission means which transmits the reflected radio signal received by receiver.

The term "unprocessed" encompasses that the reflected radio signal received by the receiver and transmitted to a device above ground is transmitted without evaluating the signal. The "raw signal" received by the receiver can be transmitted to a device above ground. Transmitting a received radio signal "unprocessed" encompasses that the radio signal can be modulated, filtered and/or amplified for the transmission purpose but, however, no information was obtained with regard to the purpose of detecting an obstacle, i.e. no evaluation of the received radio signal for the purpose of detecting an obstacle takes place in the drill head. Evaluation of the received radio signal takes place above ground. The device above ground may further comprise or be connected to a display unit to indicate information about an obstacle situated in the earth and detected by the radar unit, in particular about distance, location (i.e. direction in relation to the drilling device), size and shape. Moreover, the device above ground may further comprise or be connected with a control unit which is able to automatically execute a course correction for the drill head of the drilling device to prevent a collision with the detected obstacle.

The term "device above ground" encompasses that the respective device can be located above the earth or soil. It can also encompass that the device is located in an excavation of the earth, especially a starting or target pit used in HDD. The "device above ground" is different from the drill head and the drill string. The "device above ground" is outside the hole which is to be drilled.

The term "drill head" according to the invention encompasses a so-called steerable drill head having an end face which is slanted at least in some areas in relation to its own longitudinal axis and thus in relation to the drilling direction. The slanted surface causes a deflective force that is directed to the side during propulsion and results in a curved drilling pattern when the drill head is driven statically, i.e. does not rotate. A drilling in a straight line is possible with such a controlled drill head by operating the drill head in propulsion direction as well as rotating it so that the deflective forces compensate over a complete revolution.

The invention explicitly considers the reflected radio signal, however, signals can be considered as well which are diffracted, i.e. the diffracted radio signal, so that signals are considered which are caused by non-reflective underground obstacles. Thus, the term "reflected radio signal" encompasses the signal which is received by the receiver, irrespective whether the received signal is a reflected radio signal or a diffracted radio signal.

The electronic and/or electric components in the drill head can be powered by a battery or accumulator. Providing a battery or an accumulator in the drill head allows an independent power supply for the electric/electronic components in the drill head. The electronic and/or electric components in the drill head can also be powered, from the surface, via a wire in the drill rod.

The polarity of power provided by the power-supply can be altered or varied so that the power for supplying the electronic and/or electric components can be set to a suitable polarity scheme or can be alternated to manage any electrolytic corrosion in the drill string.

The radar used according to the invention is based in a Direct Digital Synthesizer (DDS) is a type of frequency synthesizer which can be used for creating arbitrary waveforms from a single, fixed-frequency reference clock. A sinusoidal waveform at a pre-selected frequency is preferred. A DDS circuit which can be used, can comprise (a) a phase accumulator, (b) a memory/storage, (c) a D/A converter and (d) means for transforming an analog periodic signal into analog pulses. The phase accumulator can be controlled numerically and can have predetermined input counting duration and input clock frequency and can have a phase-modulated periodic output digital signal. The memory/storage can be implemented as a ROM for phase/amplitude conversion of the phase-modulated periodic digital signal and providing an amplitude-modulated periodic digital signal. The D/A converter can convert said amplitude-modulated periodic digital signal into a quantized analog periodic signal. Preferably, said means for transforming comprise a comparator that detects the "zero crossing" of said analog periodic signal and generates driving pulses for each of said "zero crossing". Advantageously, upstream from said comparator a filter is provided for transforming said quantized analog periodic signal into a sinusoidal signal.

According to a preferred embodiment of the invention, the receiver is coupled to a signal transmitter and the signal transmitter is adapted to transmit the reflected radio signal received by the receiver unprocessed to a device above ground. Thus, the receiver for receiving the reflected radio signal can be a separate entity additional to the receiver. However, it is also possible that the receiver for receiving the reflected radio signal is adapted to transmit the reflected radio signal by itself.

According to a preferred embodiment of the invention, the receiver for receiving the reflected radio signals and/or the signal transmitter is adapted to receive the unprocessed reflected radio signal wirelessly. Thus, the device above ground is adapted to receive the reflected radio signal wirelessly. Having a wireless transmission, there is no need for a wire by which the unprocessed radio signal can be transmitted to the device above ground. The unprocessed radio signals can be transmitted via electromagnetic waves, which can be modulated. Thus, modulated electromagnetic waves are used to transfer the unprocessed radio signal to the device above ground. After demodulation of the electromagnetic waves, which were received by the device above ground, the unprocessed data can be used to visualize information and/or to generate a warning signal.

According to a preferred embodiment of the invention, the receiver is coupled to a cable or wire being connected to a connecting element for transmission of the reflected radio signal to a connection element of a drill rod segment connectable to the drill head. By providing a cable or wire for transmission the risk of interference is reduced which may be possible due to an influence on the electromagnetic wave used for wireless transmission.

According to a preferred embodiment of the invention, the drill head comprises a location acquisition device and the receiver is adapted to transmit data of the location acquisition device together with the reflected radio signal to a device above ground. The data of the obstacle detection system can be synchronized with the data of the location acquisition device. It may be possible to correlate the data of the obstacle detection device to the location information.

According to a preferred embodiment of the invention, the receiver is adapted to transmit the reflected radio signal and the data of the location acquisition device by discrete multitoned modulation (DMM). The reflected radio signal which was received by the antenna is first amplified as raw data in an amplifier. From the amplifier the signals then pass via an Ethernet-interface (which is a four-wire interface) to a DMM-Modem in the drill head, which makes the four-wire interface a two-wire interface. The signals are then transferred via a so-called "Inliner" in the drill rod or the inner pipe of a drill rod having two pipes (an outer pipe and an inner pipe) and the drill rod or the outer respective pipe and the drill rod to the device above ground, i.e. the drilling device. The device above ground can tap the transferred signal via a slip ring. A so-called "In-Cab modem" makes the two-wire interface again a four-wire interface (Ethernet). Via a commercial Ethernet-network cable the raw data then passes for evaluation to a computer at the drilling device.

The term "Ethernet" encompasses the possibility that a communication over Ethernet divides the stream of data into shorter pieces, so-called frames. Each frame can contain source and destination addresses and error checking data. The content of the frame provides the possibility that a damaged frame can be detected and discarded and/or retransmitted and/or corrected.

By using discrete multitoned modulation a signal can be separated in frequency bands. Fast Fourier transformation (FFT) algorithms can be used for modulation and demodulation.

It can be provided that the technique used can be adaptive using the most favorable tones at a rate to sustain optimum throughput. The data stream can carry an error detection and correction overhead to ensure the quality of the data.

Further, the invention provides a drilling device for earth boring, in particular a horizontal drilling device, wherein the drilling device comprises the above-mentioned drill head and a device above ground.

According to a preferred embodiment of the invention, the device above ground is adapted to steer the drill head. It becomes possible to steer the drill head and to drill a hole in the earth in response to commands or instructions entered into the device above ground. The drill head can receive the commands/instructions or the drilling device is operated in response to the device above ground.

According to a preferred embodiment of the invention, the device above ground is adapted to visualize the reflected radio signal and/or the data of a location acquisition device. The device above ground can comprise a display or monitor to visualize the information received by the obstacle detecting system (reflected radio signal) as well as the location acquisition device.

According to a preferred embodiment of the invention, the device above ground is adapted to steer the drill head in response to the reflected radio signal and/or the data of a location acquisition device. The control of the drill head or the drilling device can be an automatic control so that the drill head is steered along a pre-determined path taking into account the information given by the reflected radio signal (obstacle detection device). After avoiding the detected obstacle the drill head can be returned to its pre-determined path behind the obstacle.

Further, the invention provides a method to detect objects while earth boring, the method comprising the steps: Transmitting a radio signal generated by a DDS.

In a preferred embodiment, the method further comprises the step of Transmitting the received reflected radio signal unprocessed to a device above ground.

According to a preferred embodiment of the invention, the method comprises the step of Transmitting the received reflected radio signal via a cable through the drill head and drill rod segments being connected to the drill head.

According to a preferred embodiment of the invention, the method comprises the step of transmitting the reflected radio signal together with data of a location acquisition device, especially by discrete multitoned modulation.

According to a preferred embodiment of the invention, the method comprises the step of steering the drill head in response to the reflected radio signal.

Further, the invention provides a use of direct digital synthesizer as a signal in detecting an obstacle in earth boring.

BRIEF DESCRIPTION OF THE DRAWINGS

The invention is explained in more detail in the following, using exemplary embodiments shown in the drawings.

The drawings show.

DETAILED DESCRIPTION

Figure 1:
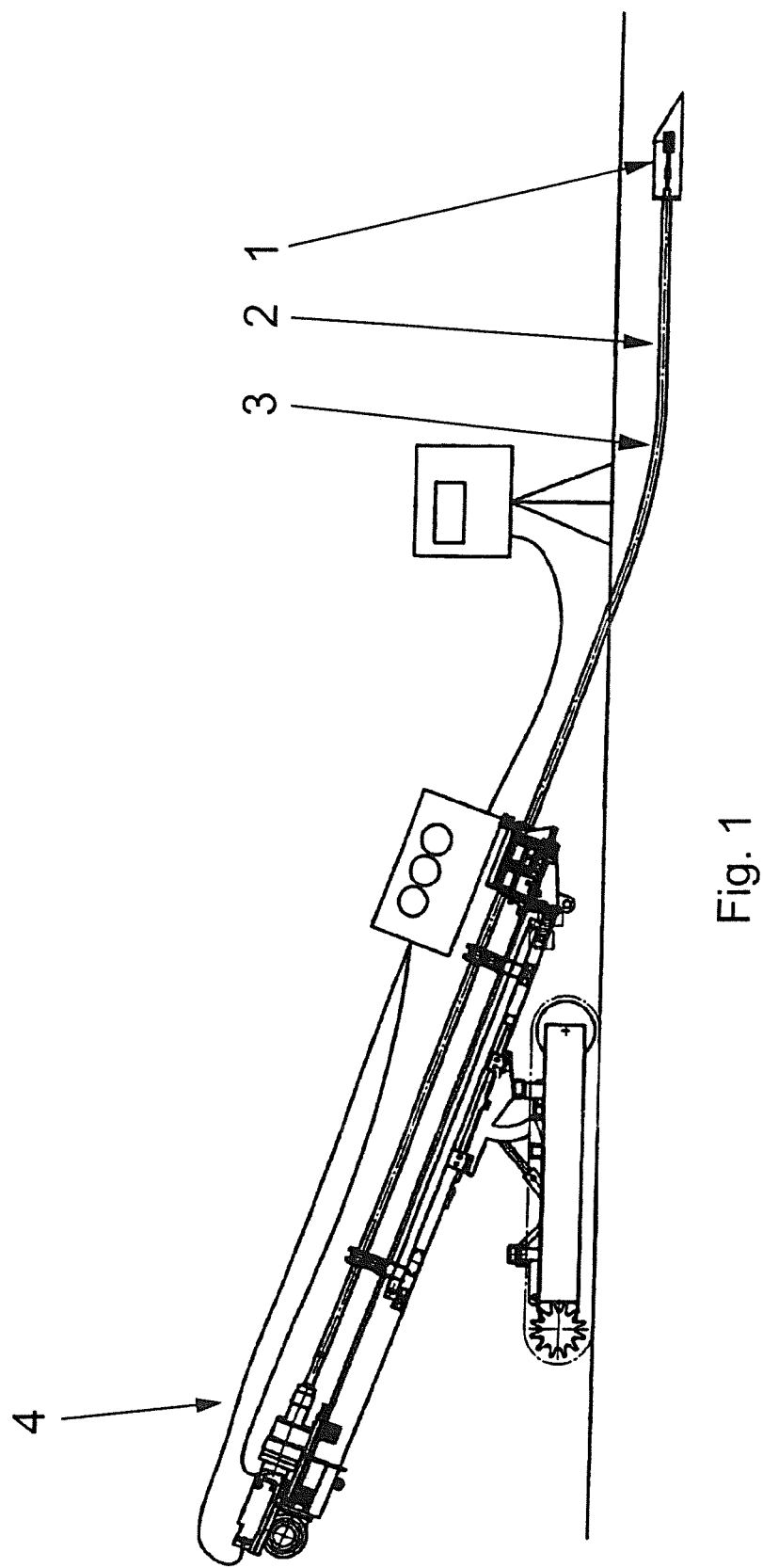
FIG. 1 a horizontal drilling device with a drill head according to the invention, FIG. 2 a further embodiment of a horizontal drilling device with a drill head according to the invention, FIG. 3 a first embodiment of a drill head according to the invention, FIG. 4 a second embodiment of a drill head according to the invention, and FIG. 5 a flow diagram describing the flow of data, signals and power.

FIG. 1 shows by way of a simplified illustration the application of a steerable horizontal drilling device which is also called a HDD drilling device. HDD is short for "Horizontal Directional Drilling". The horizontal drilling device includes a drill head 1 which involves a drill head 1 according to the invention. The drill head 1 is mounted to the leading end of a drill rod 2, with the drill rod 2 comprised of a plurality of rod sections 3 that are connected to one another via screw threads. The trailing end of the drill rod 2 is connected to a drive unit 4 by which forces in longitudinal direction of the drill rod 2 as well as a torque can be transmitted to the drill rod 2. By means of the drive unit 4, the drill rod 2 including the attached drill head 1 can be driven in thrust direction and pull direction as well as rotated.

In the horizontal drilling device of FIG. 1, the drive unit 4 is placed stationary on the earth's surface and thus above ground. The drilling operation thus starts also from the earth's surface, whereby initially it is drilled at a slant into the ground and after reaching the desired depth, the course of drilling is changed until reaching the horizontal, and then drilling continues in a substantially horizontal manner.

Deviations from the straight-lined drilling course may become necessary when obstacles (not shown) are encountered in the earth that cannot be drilled through (e.g. bedrock) or must not be drilled through (e.g. power, gas, or water lines). To detect such obstacles in the ground, the drill head is provided with a radar unit which radiates electromagnetic waves and receives these waves after the latter have been reflected from an electrically conductive object, so as to be able to calculate distance, shape, size, and location of the object. Thus radar unit is described in more detail in FIGS. 3 and 4.

Figure 2:
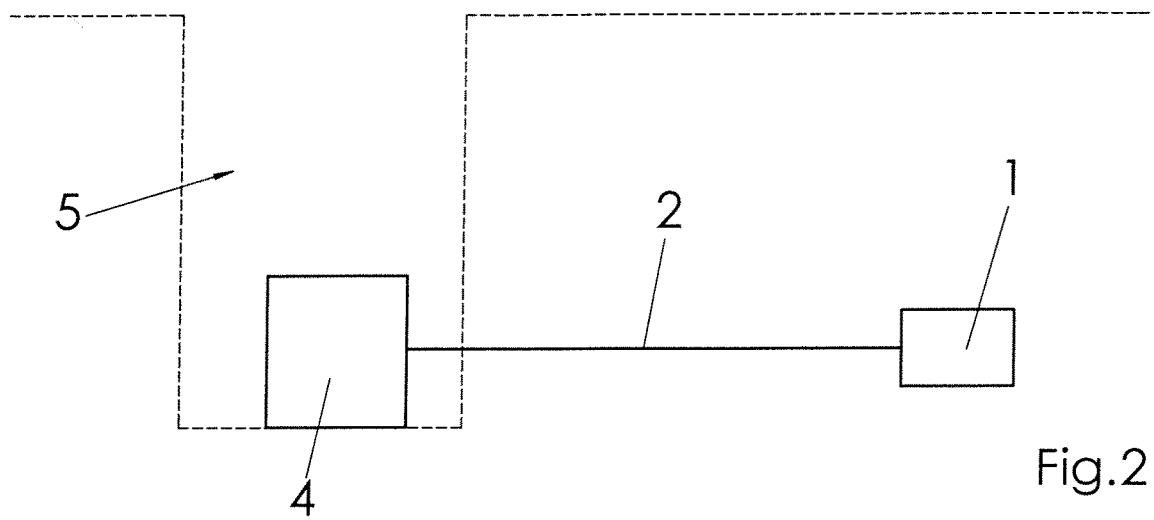

FIG. 2 shows a further embodiment in which the drive unit 4 is located in a start pit 5. According to the understanding of the present invention, the drive unit 4 is a device above ground.

Figure 3:
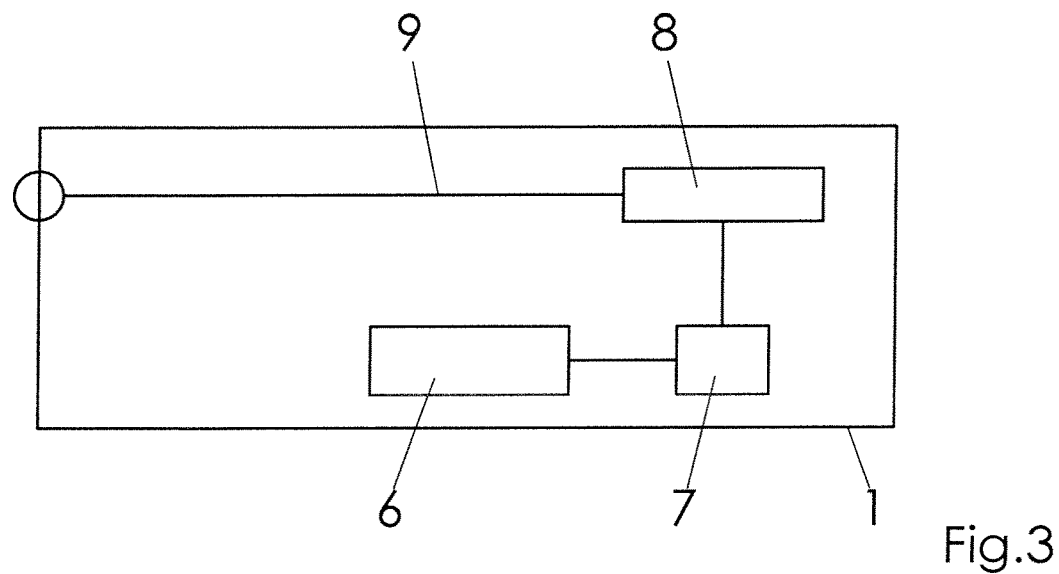
Figure 4:
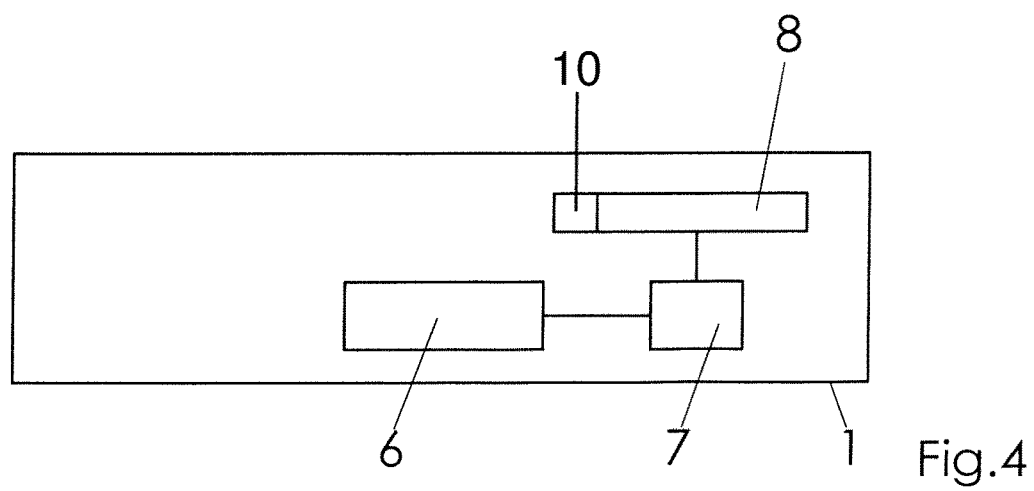

FIGS. 3 and 4 show two embodiments of a drill head 1 according to the invention with a radar unit and useable in a horizontal drilling device as shown in FIGS. 1 and 2.

The drill heads 1 of FIGS. 2 and 3 have a cylindrical shaft which is formed on its trailing end in drilling direction with a locking system by which it can be secured to the leading end of the drill rod 2. Provided on the leading end of the drill head 1 is a drill head front having a shape configured for maximum propulsion. For this purpose, the drill head front includes various hard metal elements which provide for a good cutting action in the earth and moreover are extremely wear-resistant. A slanted surface produces during propulsion in the earth a laterally directed deflection that allows steerability of the horizontal drilling device. Integrated in the slanted surface can be in addition two nozzles for bentonite flushing by which bentonite, conducted to the drill head 1 via an external feed (not shown) and via the interior of the hollow drill rod 2, exits under high pressure from the drill head and improves the drilling propulsion by the hydraulic cutting action on one hand and a softening of the earth in front of the drill head 1 on the other hand.

The radar unit is arranged in the cylindrical shaft of the drill head 1 and includes a transmitter 6 for generating an electrical pulse and emitting electromagnetic waves (reflected radio signal via antenna 7), a receiver 8 for receiving the reflected electromagnetic waves. The reflected radio signal is transmitted unprocessed to the drive unit 4. The drive unit 4 comprises an evaluation unit having a display device which can indicate information about distance, location, size, and shape of obstacles located in the earth. The evaluation unit is further connected with a control unit which enables navigation around the obstacles by respectively operating the drive unit 4.

The radar unit, especially the antenna 7, sends out the electromagnetic waves in a defined direction, whereby the region of the housing of the drill head 1 from which region the electromagnetic waves emerge, can be covered by a plate which is made of a dielectric material. In contrast thereto, the remainder of the housing of the drill head 1 can be made of steel and thus of electrically conductive material. The plate of dielectric material can ensure a sufficient passage of the electromagnetic waves through the housing of the drill head 1 so as to enable a monitoring of the earth in front of and/or to the side of the drill head 1.

The drill heads 1 illustrated in FIGS. 3 and 4 are configured essentially in three parts, comprised of a shaft end for attachment to the leading end of the drill rod 2, the drill head front whose shape is designed for optimum drilling propulsion, as well as a radar housing arranged between these components of the drill head 1 and forming part of the shaft of the drill head 1. The connection between the three parts of the drill head 1 is implemented by a quick-acting closure system with locking elements. The three-part configuration of the drill head 1 allows optional installation of the radar unit so that the drill head front can also be directly connected with the shaft end. Depending on the earth in which drilling takes place, there may be situations in which radar monitoring may not be required and since the radar unit is also fairly expensive, the optional installation of the radar unit serves only to improve effectiveness because in some cases fewer radar units may be purchased than drill heads.

The transmission of the unprocessed radio signal received via antenna 7 by the receiver 8 to the drill unit 4 according to the embodiment shown in FIG. 3 is carried out by a wire 9 coupled to the receiver 8 and leading to contact surface which comes into contact with leading end of the drill rod 2. In the drill rod 2 (each drill rod section 3) a cable is provided for establishing an electrical contact from the receiver 8 to the drill unit 4.

The transmission of the unprocessed radio signal received via antenna 7 by the receiver 8 to the drill unit 4 according to the embodiment shown in FIG. 4 is carried out wirelessly. The receiver 8 transmits the received reflected radio signal to the drill unit 4. The receiver 8 comprises a signal transmitter 10 to transmit the reflected radio signal to the drill unit 4.

Figure 5:
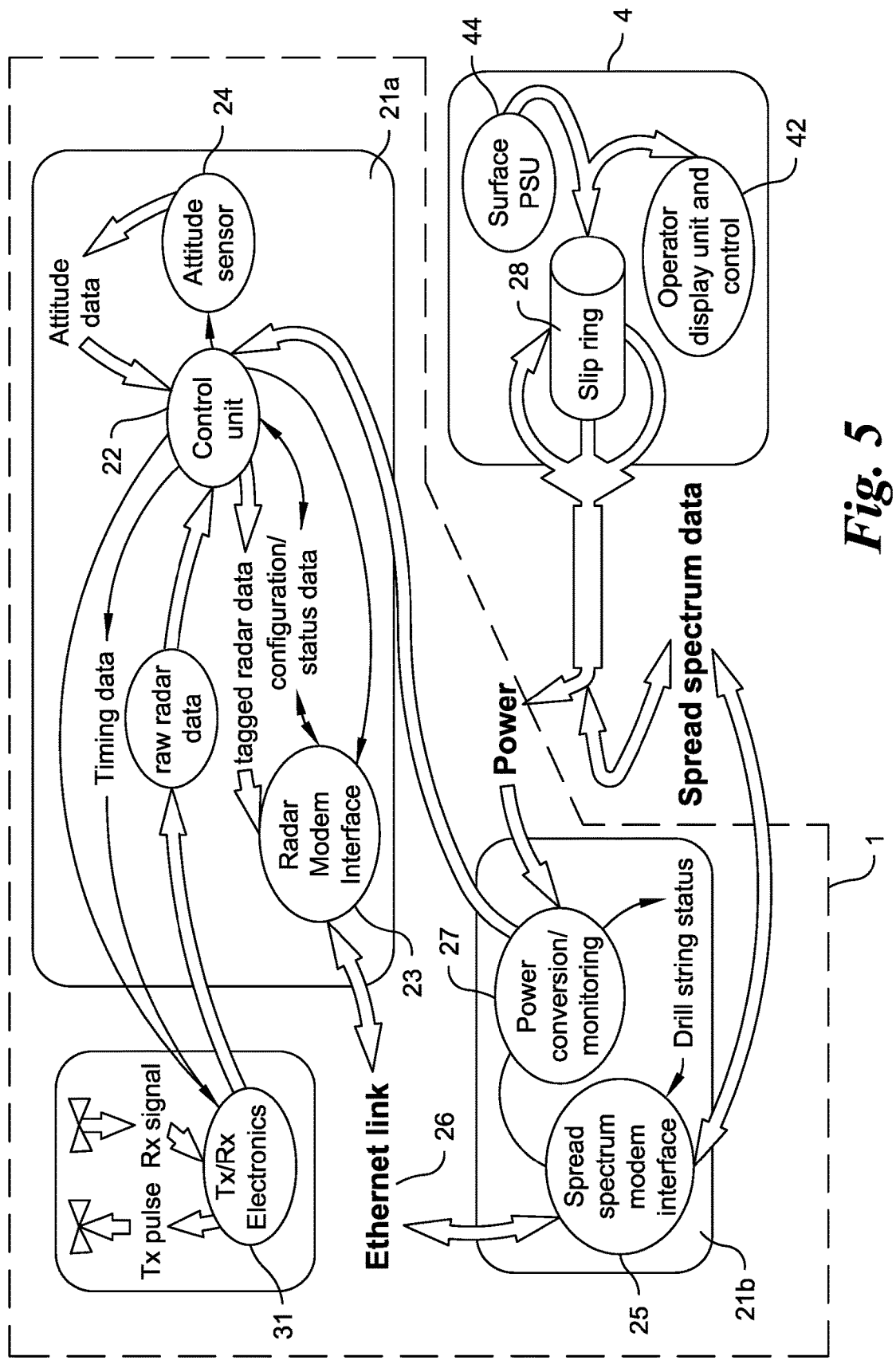

FIG. 5 describes the flow of signals, data and power according to an embodiment of the present invention. The FIG. 5 describes an exemplary system flow diagram. FIG. 5 shows schematically the components of the drill head 1. The components of the drill head 1 are encircled by a dashed line. However, the components denoted by 21a and 21b can also be comprised in a drill rod adjacent the drill head 1.

According to FIG. 5, the drill head 1 comprises Tx/Rx electronics 31, electronics 21a and electronics 21b. Tx/Rx electronics 31 is adapted to generate an electrical pulse and emit electromagnetic waves indicated by Tx pulse. Further, received electromagnetic waves indicated by Rx signal, are received by the Tx/Rx electronics 31.

The Tx/Rx electronics 31 is power-supplied by a control unit 22 contained in the electronics 21a. Further, the control unit 22 sends a timing data to the Tx/Rx electronics 31 on which basis the Tx/Rx electronics 31 generates the electrical pulse and an electromagnetic wave is transmitted. Additionally, the control unit receives the raw radar data in the form of the signal received by the Tx/Rx electronics 31. The data can be sent unprocessed.

The control unit 22 is described as being adapted to communicate with the radar modem interface 23 in a bi-directional manner. The control unit 22 is adapted to receive and send configuration and/or status data from and to the radar modem interface 23, respectively.

An attitude sensor 24 is provided which is arranged as part of the drill head electronics 21a. The attitude sensor 24 can receive power from the control unit 22. The control unit can be connected to the attitude sensor 24 so that the signal generated by the attitude sensor 24 can be received by the control unit 22. The attitude sensor 24 can determine the roll angle of the drill head 1. The roll angle can correspond to an angle by which the drill head 1 is rotated around the longitudinal axis of the drill head 1. The control unit 22 can receive a signal corresponding to the roll angle of the drill head 1.

The control unit 22 can send the received radar data unprocessed together with an information about the roll angle of the drill head 1. The respective information of radar data together with roll angle is called "tagged radar data" and send to a radar modem interface 23.

The tagged radar data is send from the radar modem interface 23 of electronics 21a to a spread spectrum modem interface 25 of electronics 21b via an Ethernet link 26. The Ethernet link 26 provides a bi-directional communication between the radar modem interface 23 and the spread spectrum modem interface 25.

The control unit 22 is supplied by power via a power conversion and monitoring unit 27. The power conversion and monitoring unit 27 serves as power supply for the spread spectrum modem interface 25. Further, the power conversion and monitoring unit 27 provides drill string status data for the spread spectrum modem interface 25.

The spread spectrum modem interface 25 provides spread spectrum data which can be sent via the drill string to the drill unit 4 controlling the drilling. The drill string serves in one direction for providing power and in a bi-directional manner for the signals of the radar data. Drill unit 4 includes surface power supply unit (PSU) 44, which supplies power via the drill string to power conversion and monitoring unit 27. The spread spectrum data can be tapped by a slip ring 28 from the drill string to a display and/or control for visualizing the information of the radar data and the roll angle. In the control the radar data can be processed based on the raw signal and the respective roll angle associated therewith. A picture can be shown on a respective device 42 which depicts the position of underground obstacles. In addition or alternatively, it can be possible that an alarm signal can be generated by a control 42 in case that the drill head 1 runs the risk to contact an obstacle in case the drill head 1 moves further in the present direction of the drill head 1.

Via the slip ring 28 it is possible to feed in the signal with regard to the radar data and/or the power into the drill string.

What is claimed is:

1. Drill head for earth boring for a horizontal drilling device, the drill head comprising:
    a drill head housing,
    a direct digital synthesizer and a transmitter, within the drill head housing, for transmitting a ground-penetrating waveform radio signal in the ground, responsive to a signal created by the direct digital synthesizer, at a given repetition frequency and at a power greater than that of a MIR-radar, to detect underground objects in the path of the drill head of the horizontal drilling device,
    an antenna and a receiver, within the drill head housing, for receiving a reflected radio signal comprising a reflection of the transmitted waveform radio signal reflected from one or more underground objects, and for transmitting, unprocessed, the reflected waveform radio signal, together with information about a roll angle of the drill head obtained from a sensor on the drill head, to a device above ground configured to process the unprocessed reflected waveform radio signal and the information about the roll angle to determine the position of the one or more underground objects with respect to the drill head of the horizontal drill device.

2. Drill head according to claim 1, wherein the device above ground is adapted to receive the unprocessed reflected radio signal wirelessly.

3. Drill head according to claim 1, further comprising a cable or wire connected at one end to the receiver and connected at another end to a contact surface on the drill head configured to contact a leading end of a drill rod segment connectable to the drill head, for transmission of the reflected radio signal from the receiver to the device above ground via the drill rod segment.

4. Drill head according to claim 1, wherein the drill head comprises a location acquisition device and the receiver is adapted to transmit data of the location acquisition device together with the reflected radio signal to a device above ground.

5. Drill head according to claim 4, wherein the receiver is adapted to transmit the reflected radio signal and the data of the location acquisition device by discrete multitoned modulation.

6. Drilling device for earth boring for a horizontal drilling device, wherein the drilling device comprises:
    a drill head for earth boring for a horizontal drilling device, the drill head comprising:
    a drill head housing,
    a direct digital synthesizer and transmitter, within the drill head housing, for transmitting a ground-penetrating waveform radio signal in the ground, responsive to a signal created by the direct digital synthesizer, at a given repetition frequency, to detect underground objects in the path of the drill head of the horizontal drilling device, and
    an antenna and a receiver, within the drill head housing, for receiving a reflected radio signal comprising a reflection of the transmitted waveform radio signal reflected from one or more underground objects, and to transmit, unprocessed, the reflected waveform radio signal to a device above ground, and
    the device above ground, which is configured to receive the unprocessed reflected waveform radio signal from a signal transmitter coupled to the receiver within the drill head housing and configured to process the unprocessed reflected waveform radio signal to determine the position of the one or more underground objects with respect to the drill head of the horizontal drill device.

7. Drilling device according to claim 6, wherein the device above ground is adapted to steer the drill head.

8. Drilling device according to claim 6, wherein the device above ground is adapted to visualize the reflected radio signal and/or the data of a location acquisition device.

9. Drilling device according to claim 8, wherein the device above ground is adapted to steer the drill head in response to the reflected radio signal and/or the data of a location acquisition device.

10. The drilling device of claim 6, wherein the antenna and drill head are further configured to transmit, unprocessed, information about a roll angle of the drill head obtained from a sensor on the drill head to the device above ground,
    wherein the device above ground is further configured to process the information about the roll angle to determine the position of the one or more underground objects with respect to the drill head of the horizontal drill device.

11. Method to detect objects while earth boring using a horizontal drilling device including a drill head with a drill head housing comprising the steps:

generating, using a direct digital synthesizer in the drill head housing, a ground-penetrating waveform radio signal;

transmitting the ground-penetrating waveform radio signal, responsive to a signal created by the direct digital synthesizer, at a given repetition frequency, by a transmitter in the drill head housing to detect underground objects in the path of the drill head of the horizontal drilling device, and receiving, by a receiver in the drill head housing, a reflected radio signal comprising a reflection of the transmitted waveform radio signal reflected from one or more underground objects; and transmitting, unprocessed, the reflected waveform radio signals to a device above ground configured to process the unprocessed reflected waveform radio signals to determine the position of the one or more underground objects with respect to the drill head of the horizontal drill device.

12. Method according to claim 11, wherein transmitting the received reflected waveform radio signals unprocessed to a device above ground comprises transmitting the received reflected waveform radio signals (a) via a wire through the drill head and drill rod segments being connected to the drill head or (b) wirelessly from the drill head to the device above ground.

13. Method according to claim 11, further comprising transmitting location data obtained from a location acquisition device by discrete multitoned modulation to the device above ground.

14. The method of claim 11, further comprising transmitting, unprocessed, information about a roll angle of the drill head obtained from a sensor on the drill head to the device above ground, wherein the device above ground is further configured to process the information about the roll angle to determine the position of the one or more underground objects with respect to the drill head of the horizontal drill device.

* * * * *